Nov. 10, 1970  J. H. G. VAN DER STEGEN  3,539,491

DIAPHRAGM CELL

Filed April 22, 1968

INVENTOR
Johan Hubert Gerardus van
             der Stegen
BY Sandoe, Hill,
   Schottler & Wilkstrom.

ATTORNEYS.

United States Patent Office 3,539,491
Patented Nov. 10, 1970

3,539,491
DIAPHRAGM CELL
Johan H. G. van der Stegen, Hengelo, Netherlands, assignor to N.V. Koninklijke Nederlandsche Zoutindustrie, Hengelo, Netherlands, a corporation of the Netherlands
Filed Apr. 22, 1968, Ser. No. 723,105
Claims priority, application Netherlands, Apr. 21, 1967, 6705604
Int. Cl. B01k 3/00
U.S. Cl. 204—266    3 Claims

ABSTRACT OF THE DISCLOSURE

A diaphragm cell is provided having opposite side walls, each of which supports a row of hollow pervious bodies or walls of cathode material, the cell having an electrolyte inlet and outlet. Each of the pervious bodies extends perpendicularly from its respective side wall in the form of a flat box and is covered with a diaphragm material. The hollow bodies define anode chambers therebetween, the electrolyte inlet being in communication with said chambers. Each chamber has a plate-like anode extending perpendicularly from the bottom thereof, the two rows of pervious bodies being coupled together to confine the anode chambers therebetween.

---

Figure 1:
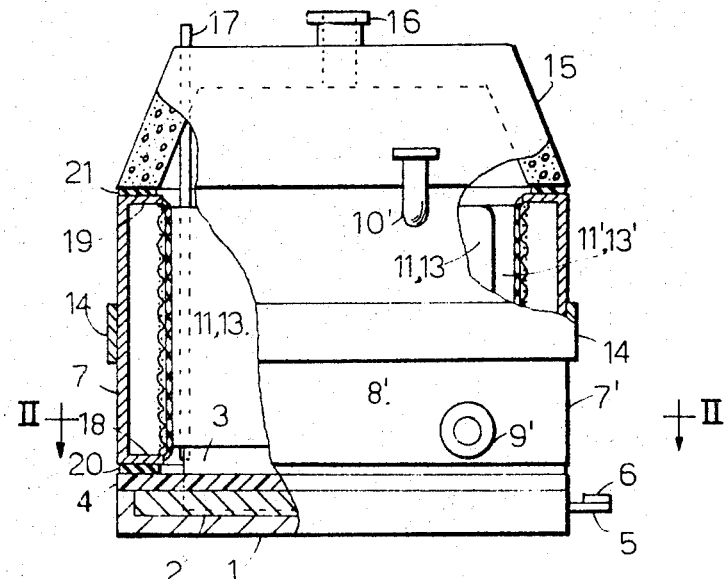

The invention relates to a diaphragm cell having opposite side walls which support a row of hollow pervious bodies or walls formed of a cathode material, the cell having an electrolyte inlet and outlet, the pervious bodies confining anode chambers therebetween.

A known example of a cell of this type is the Hooker cell which is particularly used for the production of chlorine, hydrogen and alkali hydroxide by electrolysis of alkali metal chloride solutions. Usually, the hollow bodies serving as cathode are formed from metal gauze or perforated metal plate and, as a rule, the diaphragm material arranged on the bodies consists of a fibrous material, such as asbestos or, for instance, a tissue made from synthetic fibres.

In the known cell, in each case the anodes are arranged between two adjacent cathode bodies extending from the same side wall. The distance between two adjacent cathode bodies, which equals the thickness of the anode plus two-times the desired thickness of the electrolyte layer and two-times the thickness of the layer of diaphragm material, is rather small, especially because the thickness of the electrolyte layer is chosen as small as possible in order to avoid unnecessary voltage losses. This creates a problem in applying the diaphragm material to the cathode, particularly where the cathode is wrapped up in asbestos paper or another sheet material. The problem also arises in the often used method of applying asbestos fibres by suction onto the hollow cathode bodies from a slurry of said fibres.

The object of this invention is to eliminate the foregoing difficulties. According to the invention, two rows of pervious bodies or walls are coupled together so that in each case a pervious body or wall of the one row and a pervious body or wall of the other row together confine an anode chamber therebetween.

With this method, the distance between adjacent bodies of one side wall of the cell becomes more than two-times as large. When the anode thickness is 30 mm., the electrolyte layer is 10 mm., the thickness of the layer of diaphragm material is 2 mm. and the distance between two adjacent cathode bodies is 54 mm. in the known cell where the width of a cathode body is 26 mm., then in the construction according to this invention the distance between adjacent bodies is enlarged to 134 mm. When an anode having a thickness of 4 mm. is used and the other dimensions are the same as mentioned hereinbefore, the distance between two adjacent cathode bodies would be only 32 mm. in the known cell, which would seriously interfere with arranging a diaphragm layer indeed. However, in the cell provided by the invention, the distance between adjacent bodies is 82 mm., a distance which permits the application of the diaphragm material easily.

In the preferred embodiment each of the opposite side walls of the cell forms one structure with an end wall which extends perpendicularly thereto and which confines one of the terminal pervious cathode bodies, so as to obtain two identical assemblies which can be sealed with respect to each other by interposed, vertically extending sealing strips.

Figure 2:
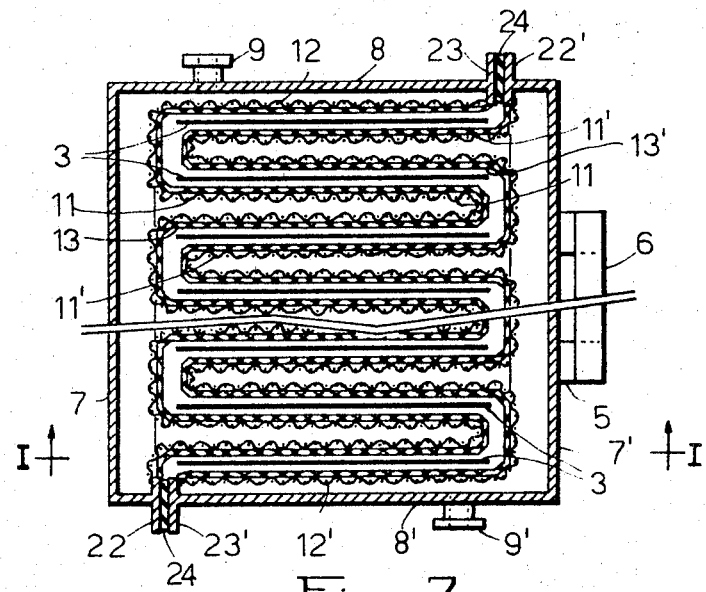

The invention will more clearly appear when considered in the light of the following disclosure and appended drawing, wherein:

FIG. 1 shows a view in elevation partly a section taken along the line I—I in FIG. 2 of one embodiment of the cell according to the invention, while FIG. 2 is a horizontal section taken along the line II—II of FIG. 1.

In the embodiment shown in FIG. 1, the bottom of the cell comprises a bottom plate 1 having a turned up flange, a metal layer 2 to which anodes 3 are fixed, and an insulating layer 4. The anodes are electrically connected by means of metal layer 2 and a number of strips 5 joined to a bus bar 6.

The side walls of the cell of the embodiment shown are formed by two identical constructions. The parts of the one construction are indicated by the same reference numbers as those of the other construction, except that the part of the corresponding construction is given a prime designation. Thus the cell comprises side walls 7, 7', end walls 8, and 8' connected therewith and provided with electrolyte outlets 9, 9' and a gas outlet 10', as well as a number of hollow pervious cathode bodies or walls defined by 11 and 11' made from metal gauze which extend perpendicularly to walls 7, 7' and to the bottom in the form of a flat box. The cathode body 12 adjacent to walls 8 and 8' forms together with that wall a terminal catholyte chamber. A layer of diaphragm material 13, 13' of, for example, asbestos, synthetic fiber and similar fibrous material, is applied onto the cathode bodies 11 and 12.

The cathode bodies or walls are supported by the walls 7, 7' and 8, 8' and are electrically coupled thereto. The walls in turn are electrically coupled to a current connection 14. In order to provide the cathode bodies with the required strength and rigidity, supporting strips and the like (not shown) may be employed.

The cell cover 15 which may, for instance, consist of concrete is provided with a gas outlet 16 and at least one electrolyte inlet pipe 17 which preferably extends to and communicates with the anolyte chamber near the bottom of the cell.

Sealing strips 20 and 21 are arranged between the flange-like parts 18 and 19 of the side walls, on the one hand, and the insulating bottom layer 14 and the cover 15, respectively, on the other hand. The wall constructions are also provided with flanges 22, 23, 22', 23', between which vertically extending sealing strips 24 are arranged.

As appears from FIG. 2, the cathode constructions are formed in such a manner that cathode body 11 of the one construction and a cathode body 11' of corresponding construction alternatingly and sinuously extend between two adjacent anodes 3. In other words, each anode chamber is confined at one side by a cathode body 11 and at the other side by a cathode body 11', the anode chambers being interconnected to each other.

The interconnected anode chambers have spaces present at the ends of cathode bodies 11, 11', in which no gas evolution takes place. By suitably dimensioning these spaces, that is to say by an appropriate choice of the length of the cathode bodies, the electrolyte circulation and thereby the discharge of the gases evolved in the anode chambers are promoted.

In summary, the invention comprises a diaphragm cell having a pair of opposite side walls assembled to a pair of end walls and having electrolyte inlet and outlet means associated therewith. A row of hollow pervious bodies or walls of cathode material is supported by one of the side walls, the row of the pervious walls having preferably a sinuous rectangular configuration, the other side wall also supporting a row of hollow pervious bodies or walls having a similar configuration, each of the pervious bodies being coated with a fibrous diaphragm material such as asbestos, synthetic fibers, and the like. By providing the parts in the form of two construction elements, one comprising the first side wall and its connected row of pervious bodies and the other comprising the second side wall and its connected row of pervious bodies, and assembling them together as shown in FIG. 2 with sealing strip 24 therebetween, a plurality of anode compartments are provided interconnected together with a sinuous configuration, thereby maximizing the use of the space in the cell. The sinuous configuration may advantageously take a rectangular form, such as a flat box.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A diaphragm cell having a pair of opposite side walls and end walls, an electrolyte inlet and outlet associated with said cell, a row of hollow pervious bodies of cathode material connected to one of said side walls, a row of like hollow pervious bodies connected to the other of said side walls, each of said pervious bodies being coated with a diaphragm material and extending substantially perpendicularly from its respective side wall in the shape of a flat box, said side walls and said end walls being assembled together such that the two rows of pervious bodies are supported in alternate, generally parallel spatial relationship with each other and confine anode chambers therebetween, and a plate-like anode disposed in each of said anode chambers and extending upwardly from the bottom thereof, said electrolyte inlet communicating with said anode chambers.

2. The diaphragm cell according to claim 1, wherein one side wall and its connected row of pervious bodies provides a construction element and the other side wall and its connected row of pervious bodies provides a substantially identical complementary construction element, such that the cell is formed by assembling the two elements together in sealing relationship.

3. The diaphragm cell of claim 1, wherein each of the two rows of the pervious bodies conform one to the other, such that when the two rows are assembled in spatial relation to each other in the cell, the anode chambers confined therebetween are interconnected to provide a sinuous configuration.

References Cited

UNITED STATES PATENTS

| | | | |
|---|---|---|---|
| 1,620,052 | 3/1927 | Allan | 204—266 XR |
| 3,344,053 | 9/1967 | Neipert et al. | 204—263 XR |
| 3,390,072 | 6/1968 | Wiseman | 204—263 XR |
| 3,477,937 | 11/1969 | Gullett et al. | 204—263 |

JOHN H. MACK, Primary Examiner

F. C. EDMUNDSON, Assistant Examiner